(12) United States Patent
Basu et al.

(10) Patent No.: US 11,743,040 B2
(45) Date of Patent: Aug. 29, 2023

(54) VAULT ENCRYPTION ABSTRACTION FRAMEWORK SYSTEM

(71) Applicant: Bank of America Corporation, Charlotte, NC (US)

(72) Inventors: Sourav Basu, Charlotte, NC (US); Peter Anthony Tavormina, Hainesport, NJ (US)

(73) Assignee: Bank of America Corporation, Charlotte, NC (US)

(*) Notice: Subject to any disclaimer, the term of this patent is extended or adjusted under 35 U.S.C. 154(b) by 232 days.

(21) Appl. No.: 17/358,784

(22) Filed: Jun. 25, 2021

(65) Prior Publication Data

US 2022/0417014 A1 Dec. 29, 2022

(51) Int. Cl.
*H04L 9/08* (2006.01)
*H04L 9/32* (2006.01)
*H04L 9/06* (2006.01)
*G06F 9/445* (2018.01)
*H04L 67/133* (2022.01)

(52) U.S. Cl.
CPC ........ *H04L 9/0891* (2013.01); *G06F 9/44505* (2013.01); *H04L 9/3213* (2013.01); *H04L 67/133* (2022.05)

(58) Field of Classification Search
CPC ... G06F 9/44505; G06F 21/00; H04L 9/0891; H04L 67/133; H04L 67/02; H04L 9/3213
See application file for complete search history.

(56) References Cited

U.S. PATENT DOCUMENTS

| | | | |
|---|---|---|---|
| 6,931,526 B1 | 8/2005 | Bacha et al. | |
| 7,814,125 B2 * | 10/2010 | Berry | G06F 8/38 |
| | | | 707/790 |
| 8,745,755 B2 | 6/2014 | Borzycki et al. | |
| 9,137,659 B2 | 9/2015 | Khosravi et al. | |
| 9,841,899 B2 | 12/2017 | Leggette et al. | |
| 9,866,449 B2 * | 1/2018 | Post | H04L 41/5045 |
| 10,049,224 B2 | 8/2018 | Momchilov et al. | |
| 10,489,071 B2 | 11/2019 | Cilfone et al. | |
| 2005/0086465 A1 | 4/2005 | Sapkota et al. | |
| 2010/0124196 A1 | 5/2010 | Bonar et al. | |
| 2012/0290694 A9 | 11/2012 | Marl et al. | |

(Continued)

*Primary Examiner* — Mohammad A Siddiqi
(74) *Attorney, Agent, or Firm* — Banner & Witcoff, Ltd.

(57) ABSTRACT

A vault encryption abstraction framework computing system provides interface functionality to facilitate integration of client applications with vaulting solutions. The vault encryption abstraction framework manages custom authentication and authorization using the vaulting solution application for one or more client applications such as by periodically rotating or renewing any authentication tokens. The vault encryption abstraction framework includes a scheduler to manage timing requirements and to configure the client application to the schedule by setting the renewed token value to an API endpoint (e.g., a function return) and/or a configuration file for access by one or more client applications. This event triggers the client application to update to the latest token value. The vault encryption abstraction framework then triggers the vaulting solution to create and return the new key. The new key is then returned to the client application. A history of the key generation messages and subsequent status is saved in a data log.

19 Claims, 4 Drawing Sheets

(56) References Cited

U.S. PATENT DOCUMENTS

| 2015/0032627 | A1* | 1/2015 | Dill ........................ G06Q 20/40 |
| | | | 705/44 |
| 2017/0032139 | A1  | 2/2017 | Resch |
| 2018/0123914 | A1* | 5/2018 | Post ..................... H04L 41/5048 |
| 2022/0207022 | A1* | 6/2022 | Wood ........................ G06F 8/65 |
| 2022/0237368 | A1* | 7/2022 | Tran ........................ G06N 3/045 |

* cited by examiner

VAULT ENCRYPTION ABSTRACTION FRAMEWORK SYSTEM

BACKGROUND

Aspects of the disclosure relate to managing vaulting and/or encryption solutions for an enterprise computing system. One or more aspects of the disclosure relate to a computing framework for brokering and/or managing key or token rotation functionality and/or scheduling for custom authentication, authorization and/or audit controls.

Enterprise computing systems may support or provide one or more applications that process and/or produce sensitive, private, and/or business-critical data. In some cases, an enterprise organization may be required, such as for regulatory reasons, to ensure data security is maintained and/or to meet data retention requirements. As such, the enterprise organization may utilize one or more data storage technologies to store the process, store, and/or produce information subject to regulatory or other data storage requirements. Often, to meet these requirements, the enterprise organization may utilize vaulting and/or encryption solutions provided by third-party vendors. The vaulting and/or encryption solutions may require custom authentication tokens to be rotated periodically or may have custom authorization mechanisms, which may require custom changes in client applications. Often, the client applications may be difficult to modify, such as those provided by outside vendors. As such, the customization requirements for the vaulting and/or encryption may be expensive for the enterprise organization to make across multiple applications or, in some cases, may not be feasible, leading the enterprise organization to be locked into using solutions from one particular vendor.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with brokering interactions between applications for managing custom authentication, authorization, and audit controls.

In some cases, an abstraction framework computing system may include a first computing device processing instructions to provide functionality via a first application, a vault computing device processing instructions to provide data vault and encryption services, and a framework computing device may include a processor and non-transitory memory. The framework computing device may execute instructions stored in the memory that, when executed by a processor, cause the framework computing device to receive, via an application interface by an abstraction framework and from the first computing device, an electronic command request from the application to update an electronic security token, wherein the request is in a first format, trigger, by the abstraction framework and based on the electronic command, generation of the electronic security token by the vault computing device, receive, via a vault interface and from the vault computing device, a response message comprising the electronic security token, wherein the response message is in a second format, and send, via the application interface and via a network by the abstraction framework to the first computing device, a second response message comprising the electronic security token, wherein the second response message is in the first format.

In some cases, the framework computing device may be process instructions to configure, via a configuration file, a scheduler of the abstraction framework via a configuration file and initiate, based on a scheduling event at the first computing device triggered by the scheduler, the first application to communicate a request to update to the electronic security token. In some cases, the framework computing device may send, by the scheduler via the network, the scheduling event to the first computing device. In some cases, the scheduling event is generated by the framework computing device and pushed to the first computing device. In some cases, the first format comprises a configuration file and the second format comprises an application programming interface function. In some cases, the first format comprises a first application programming interface function and the second format comprises a second application interface function, wherein the first application programming interface function is incompatible with the second application programming interface function. In some cases, the framework computing device may store information about the request received from the application and the response from the vault computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

Enterprise organizations use many software applications to provide products and/or services to users, both internal and external to the organization. Many of these applications utilize and/or generate sensitive or private information, some of which may be subject to privacy, security and/or regulatory policies. To manage secure the sensitive or private information the enterprise organization may turn to one or more third party vaulting and/or encryption solutions. Vaulting and/or encryption solutions may require custom authentication tokens to be rotated periodically and/or have custom authorization mechanisms that may require custom changes in client applications. In some cases, legacy application, third party applications, and others may not allow for customization many of which can be vendor applications too. Additionally, the customizations and/or changes can be expensive for the enterprise organizations to make across multiple applications. In some cases, customizations may require a change in hardware, operating system, and/or other applications that, in some cases, may not be feasible, leading to the enterprise organizations being locked into a single vendor for the vaulting and/or encryption solutions.

Aspects of the disclosure provide effective, efficient, scalable, and convenient technical solutions that address and overcome the technical problems associated with brokering interactions between applications for a computing framework to abstract and broker interactions with various vaulting and/or encryption tools. In some cases, third party or vendor vaulting tools may not be customizable to fit regulatory and/or business requirements for securing digital information through operations such as key or token rotation or custom authentication, authorization & audit controls. The vault encryption abstraction framework computing system may provide standalone or embedded application programming interfaces (APIs) or software development kits (SDKs) to facilitate client application and vault application integration. The vault encryption abstraction framework computing system manages custom authentication and authorization against the vaulting solution application on behalf of one or more client applications such as by periodically rotating or renewing any authentication tokens. To do so, the vault encryption abstraction framework computing system may use an in-memory scheduler to manage timing requirements and to configure the client application to the schedule by setting the renewed token value to an API endpoint (e.g., a function return) and/or a configuration file for access by one or more client applications, such as by triggering an event on a client application interface. This event may trigger the client application to update to the latest token value and use it for its subsequent vaulting operations. The vault encryption abstraction framework computing system may store a refresh or scheduler update at a function return endpoint and/or configuration file location, where the endpoint or configuration file location is configurable and may be set based on the client application or by the client application. The vault encryption abstraction framework computing system logs all operations to a centralized repository to facilitate traceability for troubleshooting and/or audit purposes on behalf of the client applications. The scheduler of the vault encryption abstraction framework computing system may allow the framework to notify client applications when a token has been renewed or modified and/or to trigger the client application to complete the update process.

The vault encryption abstraction framework computing system abstracts the complexities of managing vaulting and makes them transparent to the client applications, thereby making future changes in the vaulting solution easier to manage, repeatable/reusable across the Enterprise and vendor agnostic.

Figure 1:
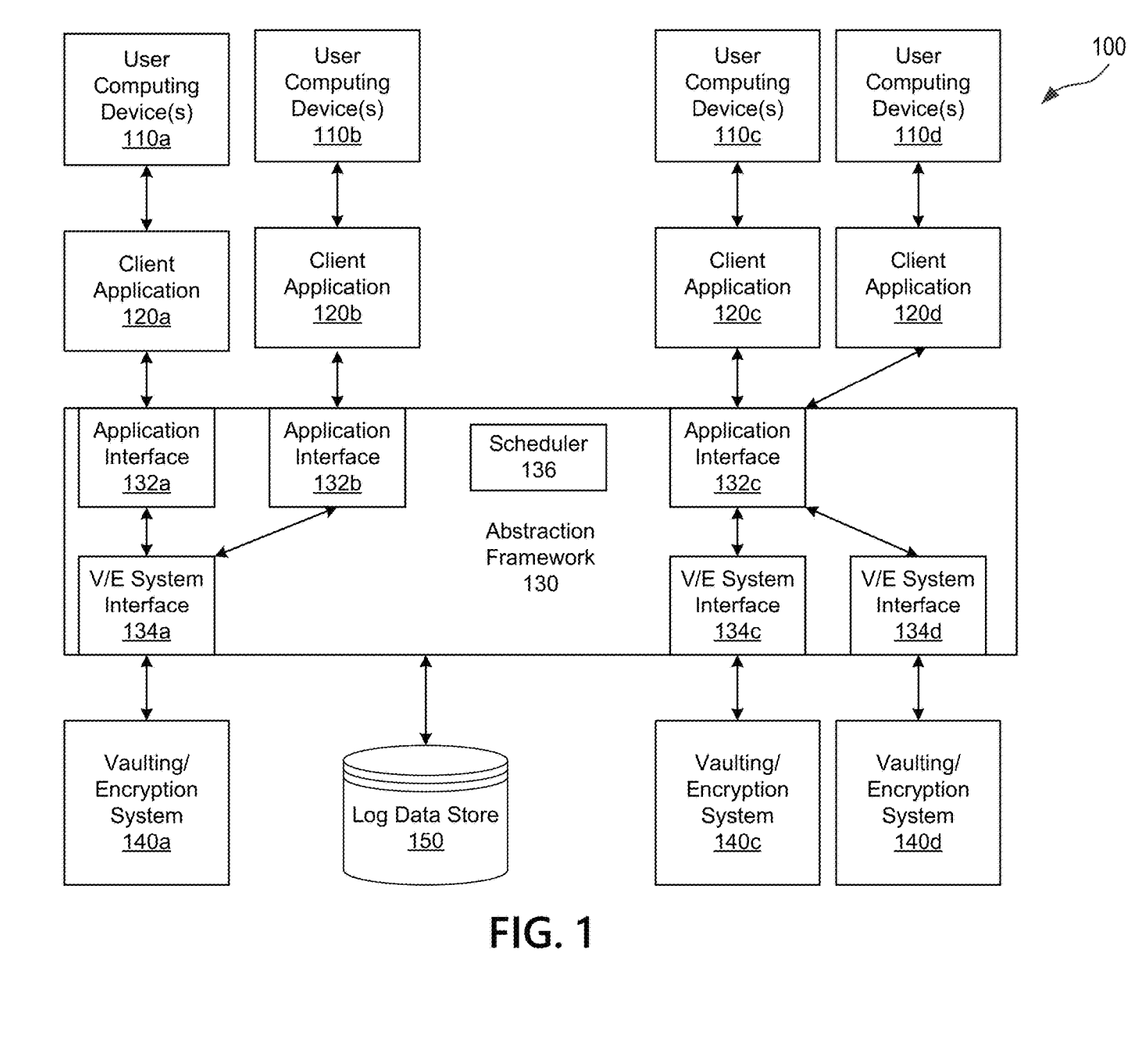
FIG. 1 shows an illustrative block diagram of a vault encryption abstraction framework computing system in accordance with one or more aspects described herein.

FIG. 1 shows an illustrative block diagram of a vault encryption abstraction framework computing system 100 in accordance with one or more aspects described herein. The illustrative vault encryption abstraction framework computing system 100 includes a plurality of user computing devices (e.g., computing device(s) 110a, computing device(s) 110b, computing device(s) 110c, and computing device(s) 110d) communicatively coupled to an enterprise network to access one or more client applications (e.g., client application 120a, client application 120b, client application 120c, and client application 120d) being processed by one or more computing devices (e.g., servers) of the enterprise network. The client applications 120a-d may process and/or produce sensitive information that may be stored on the enterprise network in one or more secure data stores (not shown). Access to the one or more data stores may be secured via an authentication process that may use authentication keys and/or tokens. The keys and/or tokens may be deployed by each client application 120a, 120b, 120c, and 120d as part of a configuration file and, in some cases, may be accessible via the enterprise network in an unencrypted format (e.g., as plain text) if not otherwise secured. The enterprise organization may then utilize one or more vaulting and/or encryption systems to manage access to the protected or private information, such as a vaulting and/or encryption system 140a, a vaulting and/or encryption system 140b, and a vaulting and/or encryption system 140c. In some cases, the vaulting and/or encryption system 140a may be used to manage private and/or secure information, such as cryptographic keys or other sensitive information (e.g., passwords, certificates, secure shell protocol (SSH) keys, or authentication tokens. To facilitate access to this sensitive information, the vaulting and/or encryption system 140a may provide an API or SDK to, for example, create a software key for use by an enterprise application.

In some cases, the enterprise organization may utilize a vault encryption abstraction framework 130 to facilitate management of vaulting for sensitive information and/or to improve security efficiencies by allowing quick and transparent integration of the vaulting and/or encryption system 140 with at least one client application, such as client application 120a. As such, the vault encryption abstraction framework 130 may allow simpler set up and/or changeover between different vaulting solutions by making use of each vaulting solution seamless and interchangeable to each application. Because an API or SDK interface for each application 120a and/or each vaulting and/or encryption system 140c is managed automatically by the vault encryption abstraction framework 130, the use of different vaulting solutions are easier to manage, are repeatable/reusable throughout the enterprise computing system, and are vendor agnostic. Here, the vault encryption abstraction framework 130 receives information from a client application via an application interface and converts the information, if necessary, into a format capable of being interpreted by the particular vaulting encryption systems. The vault encryption abstraction framework 130 identifies a target vaulting encryption system from a configuration file or via information received via the application interface associated with the client application. When the information is ready, the vault encryption abstraction framework 130 communicates the converted information (e.g., a token request), via the vaulting and/or encryption system interface. The vaulting encryption system 140 returns, to the vaulting and/or encryption interface, the generated key or an error if one occurs. The vault encryption abstraction framework 130 then communicates the key and/or any additional information such as an error condition to the client application via the application interface.

The vault encryption abstraction framework 130 may include one or more application interfaces, such as the application interface 132a, 132b, and 132c, where each application interface may be different and customized for each associated client application 120a, 120b, 120c, 120d. In some cases, an application interface 132c may present a common interface to two or more client applications 120c and 120d, where API or SDK functions may be accessible and capable of use by the different applications. In some cases, the API and/or SDK functions may be customized based on requirements set forth by an application creator or vendor. For example, the abstraction framework 130 may integrate or adapt interface functionality defined as a client application interface. As shown in FIG. 1, the application interface 132a may be customized based on interface requirements of the client application 120a and the application interface 132b may be customized based on interface requirements of the client application 120b. Similarly, the vaulting and/or encryption system interface 134a, 134c and/or 134d may be customized based on interface requirements of the vaulting encryption systems 140a, 140c, and 140d. In some cases, the vault encryption abstraction framework 130 may facilitate custom authentication and authorization functionality via the vaulting and/or encryption system 140a on behalf of different client applications 120a and 120b. In some cases, the vault encryption abstraction framework 130 may utilize a common application interface 132c to facilitate custom authentication and authorization functionality via two or more vaulting and/or encryption systems 140c and 140d via different vaulting and/or encryption interfaces 134c and 134d. As such, switching between vaulting solutions may be simplified and automated through the vault encryption abstraction framework 130 such that rather than reprogramming and customizing each application's connection to a particular vaulting solution, such as by adding or upgrading hardware, a switch between vaulting encryption system 140c and vaulting encryption system 140d may be as simple as performing a simple configuration to modify which vaulting encryption system is to be used with the particular client application or applications. In some cases, the vaulting and/or encryption interfaces may include functionality to trigger the associated vaulting and/or encryption system to create keys, enable or disable keys, get a key (optionally by a version identifier), update a key, create a key version, return a list of key versions, cancel a deletion of a key, schedule a key deletion, and the like.

Vaulting and/or encryption system 140a, 140c, and 140d may be used to create and store keys and/or secrets. Each vault and/or encryption system may have different features and functionality, such as degrees of storage isolation, access to management and encryption, scalability, and the ability to back up. Vaulting and/or encryption systems, such as vaulting and/or encryption systems 140a may support particular encryption algorithms, such as one or more of Advanced Encryption Standard (AES), the Rivest-Shamir-Adleman (RSA) algorithm, and the elliptic curve digital signature algorithm (ECDSA), where the different encryption mechanisms may be used to encrypt symmetric and/or asymmetric keys for encryption and decryption functionality and/or for other data security functionality that may be utilized by the client applications, such as for signing digital messages. Keys may have one or more key versions, each of which contains cryptographic material. The vaulting and/or encryption system 140a may generate cryptographic information for keys based on a specific algorithm allows use of the key for encryption, digital signatures, and the like. When used for encryption, a key or key pair may be used to encrypt and subsequently decrypt the information to protect the information when stored or while the information is being communicated. For example, a symmetric key (e.g., an AES symmetric key) may use a same key to encrypt and decrypt information, while an asymmetric key (e.g., an RSA asymmetric key) may use a public key to encrypt information and a private key during decryption.

In some cases, the vaulting and/or encryption system 140a may automatically assign a version to an encryption key. When scheduled, by the scheduler 136, the vault encryption abstraction framework 130 may initiate a key rotation where the vault encryption abstraction framework 130 triggers one or more of the vaulting or encryption systems 140a, 140c, or 140d to generate a new key version. Additionally, vault encryption abstraction framework 130 may facilitate customized key generation through the vaulting and/or encryption interfaces 134a, 134b, and 134c, such as by providing key material for use in generation of a new key version via a function call. The scheduler 136 may be configured or otherwise programmed for periodically rotating keys to limit an amount of data allowed to be encrypted or signed by any particular key version to minimize risk of unauthorized data accessed if a key is ever compromised. In some cases, the vault encryption abstraction framework 130 may provide functionality via the vaulting and/or encryption interfaces 134a, 134b, and 134c and/or the application interface(s) 132a, 132b, 132c, and 132d.

In some cases, the vault encryption abstraction framework 130 may manage custom authentication and authorization against, for example, the vaulting solution 140a on behalf of the client application 130a by periodically rotating or renewing any authentication tokens using an in-memory scheduler 136 and then setting the renewed token value to an API or SDK endpoint (e.g., the application interface 132a) or a configuration file (e.g., application interface 132b) to facilitate use on the client application 120a side. This scheduled event may trigger the client application 120a to update the latest token value and use it for its subsequent vaulting operations. In some cases, the scheduler 136 functionality to refresh a schedule and/or update endpoint (e.g., API function call) or config file location may be configurable. As such, the scheduler 136 may be set by the client application based on, for example, security and/or regulatory rules. In some cases, the vault encryption abstraction framework 130 may log all scheduling and/or vaulting operations to a centralized repository, such as the log data store 150, for traceability and/or audit purposes and as required by one or more of the client applications 120a, 120b, 120c, and 120c. Additionally, the vault encryption abstraction framework 130 may include notification capability to allow the vault encryption abstraction framework 130 to notify client applications 120a, 120b, 120c, and 120d when a token has been renewed or modified.

Figure 2:
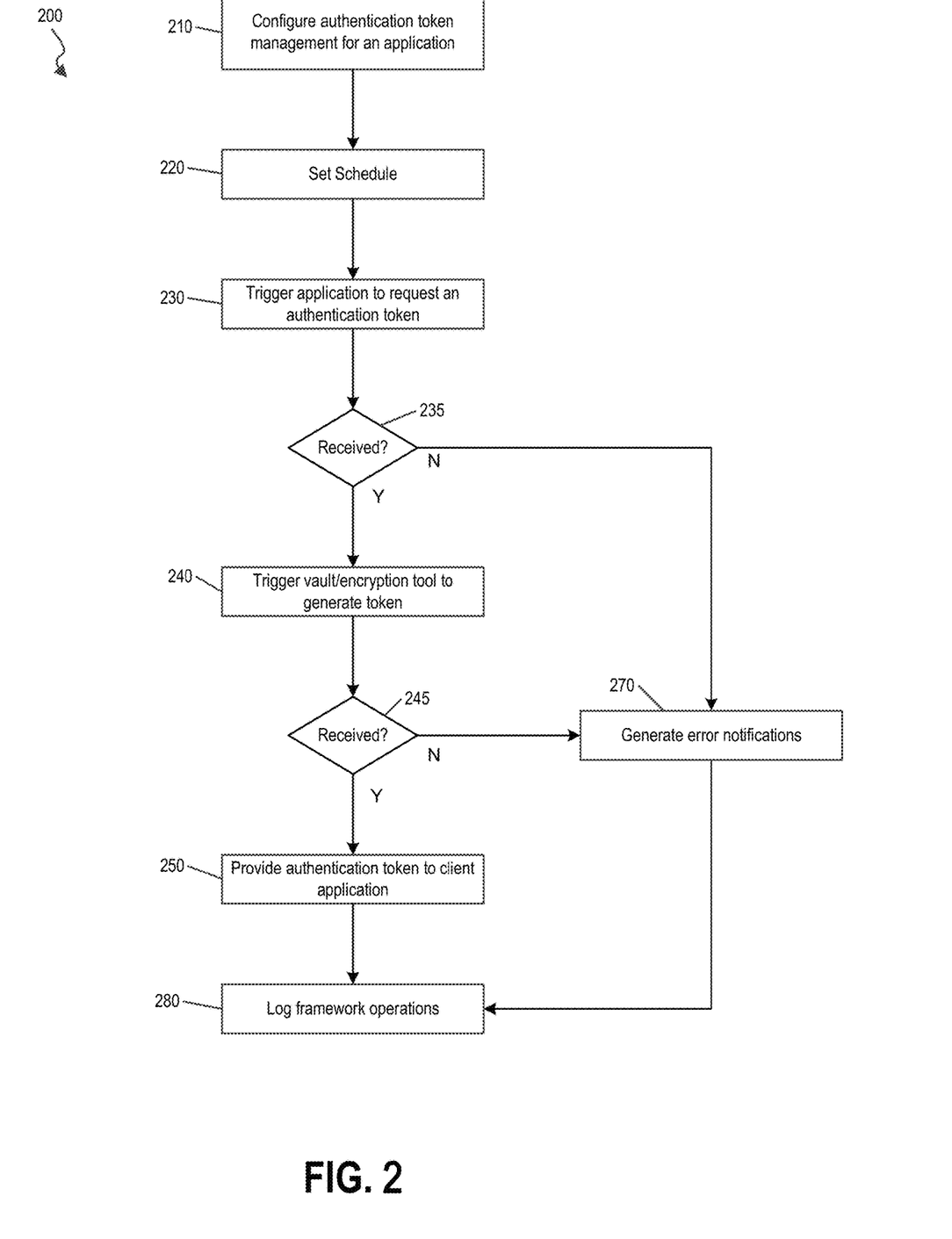
FIG. 2 shows an illustrative method of operation of the vault encryption abstraction framework in accordance with one or more aspects described herein.

FIG. 2 shows an illustrative method of operation 200 of the vault encryption abstraction framework in accordance with one or more aspects described herein. At 210, the vault encryption abstraction framework 130 may be configured such as to interface the client application 120a with the vaulting encryption system 140a via the application interface 132a and the vaulting and/or encryption interface 134a.

In some cases, communication, data security and/or scheduling parameters may be set in a configuration file such as to set a time duration for periodically rotating and/or renewing authorization tokens via the scheduler 136. In some cases, the configuration file specifies an encryption algorithm type. At 220, the scheduler 136 may be initialized to set the renewal or rotation schedule for one or more different client applications. In some cases, a rotation schedule may be set the same for a plurality of different client applications and/or a rotation schedule may be configured differently for each client application. For example, a security token may be scheduled to be rotated monthly, quarterly, yearly and the like. In some cases, the scheduler may be configured to allow an immediate token rotation to be triggered such as in response to a notification signal responsive to an indication that a data breach has been identified or is suspected. At 230, the scheduler 136 triggers the client application 120a to request an authentication token, such as by sending a message or via a push. In some cases, the request is to generate a new token. In some cases, the request is to renew a token and/or to perform a token rotation. At 235, the vault encryption abstraction framework 130 monitors messages received via the vaulting and/or encryption interface 134a from the client application 120a, such as via API function calls, to determine whether a token request has been received. If so, at 240, the vault encryption abstraction framework 130 converts the received input information into a format expected by the vaulting and/or encryption system 140a and triggers the vaulting and/or encryption system 140a, via the vaulting and/or encryption interface 134a, to generate the requested token. If, at 235, a request is not received from the client application 120a within a specified duration, the vault encryption abstraction framework 130 may generate an error at 270 and log the operations in the data store 150 at 280.

At 245, the vault encryption abstraction framework 130 may wait for a response from the vaulting or encryption systems 140a via the vaulting and/or encryption interface 134a including the token, such as via an API function return. If a token is received, the vault encryption abstraction framework 130 may return the token to the client application via the application interface 132a and log the framework operations during the token generation process and/or the token rotation process in the data store 150 at 280. If, the vaulting or encryption systems 140a fails to respond within a specified duration or returns an error, the vault encryption abstraction framework 130 generates an error notification to the client application and/or via a visual display to a user at 270 and logs the operations in the data store 150

Figure 3:
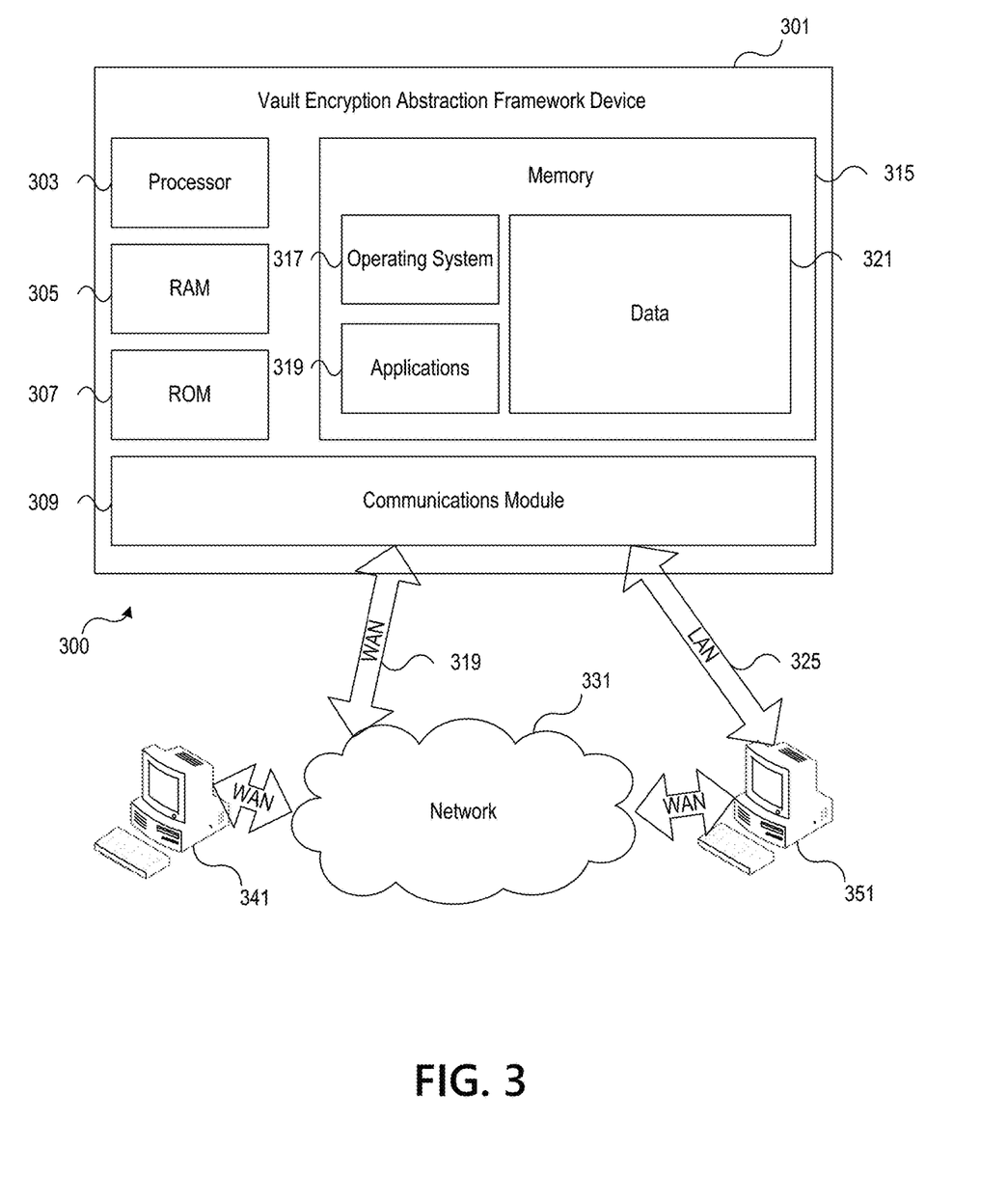
FIG. 3 shows an illustrative vault encryption abstraction framework environment in which various aspects of the disclosure may be implemented in accordance with one or more aspects described herein.

FIG. 3 shows an illustrative operating environment in which various aspects of the present disclosure may be implemented in accordance with one or more example embodiments. Referring to FIG. 3, a computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative vault encryption abstraction framework device 301 having a processor 303 for controlling overall operation of the vault encryption abstraction framework device 301 and its associated components, including a Random-Access Memory (RAM) 305, a Read-Only Memory (ROM) 307, a communications module 309, and a memory 315. The vault encryption abstraction framework device 301 may include a variety of computer readable media. Computer readable media may be any available media that may be accessed by the vault encryption abstraction framework device 301, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the vault encryption abstraction framework device 301.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the vault encryption abstraction framework device 301. Such a processor may execute computer-executable instructions stored on a computer-readable medium.

Software may be stored within the memory 315 and/or other digital storage to provide instructions to the processor 303 for enabling the vault encryption abstraction framework device 301 to perform various functions as discussed herein. For example, the memory 315 may store software used by the vault encryption abstraction framework device 301, such as an operating system 317, one or more application programs 319, and/or an associated database 321. In addition, some or all of the computer executable instructions for the vault encryption abstraction framework device 301 may be embodied in hardware or firmware. Although not shown, the RAM 305 may include one or more applications representing the application data stored in the RAM 305 while the vault encryption abstraction framework device 301 is on and corresponding software applications (e.g., software tasks) are running on the vault encryption abstraction framework device 301.

The communications module 309 may include a microphone, a keypad, a touch screen, and/or a stylus through which a user of the vault encryption abstraction framework device 301 may provide input, and may include one or more of a speaker for providing audio output and a video display device for providing textual, audiovisual and/or graphical output. The computing system environment 300 may also include optical scanners (not shown).

The vault encryption abstraction framework device 301 may operate in a networked environment supporting connections to one or more remote computing devices, such as the computing devices 341 and 351. The computing devices 341 and 351 may be personal computing devices or servers that include any or all of the elements described above relative to the vault encryption abstraction framework device 301.

The network connections depicted in FIG. 3 may include a Local Area Network (LAN) 325 and/or a Wide Area Network (WAN) 329, as well as other networks. When used in a LAN networking environment, the vault encryption abstraction framework device 301 may be connected to the LAN 325 through a network interface or adapter in the communications module 309. When used in a WAN networking environment, the vault encryption abstraction framework device 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 4:
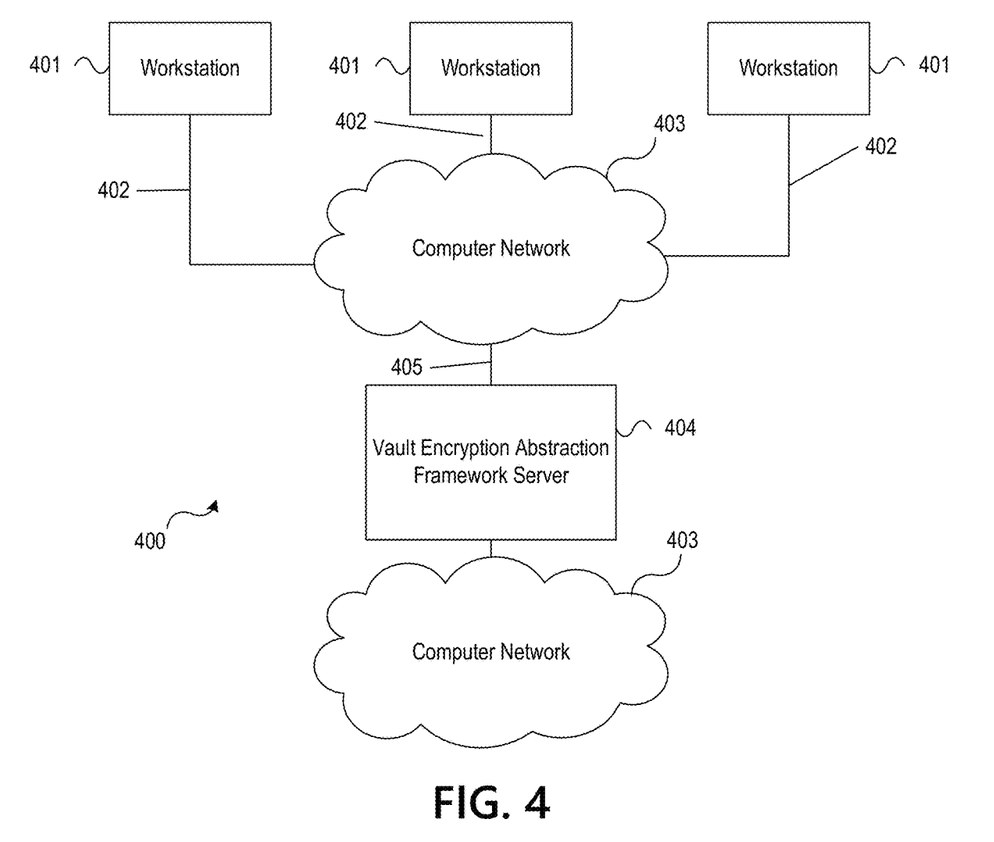
FIG. 4 shows an illustrative block diagram of workstations and servers that may be used to implement the processes and functions of certain aspects of the present disclosure in accordance with one or more aspects described herein.

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. As illustrated, the system 400 may include one or more workstation computers 401. The workstation 401 may be, for example, a desktop computer, a smartphone, a wireless device, a tablet computer, a laptop computer, and the like, configured to perform various processes described herein. The workstations 401 may be local or remote, and may be connected by one of the communications links 402 to a computer network 403 that is linked via the communications link 405 to the vault encryption abstraction server 404. In the system 400, the vault encryption abstraction server 404 may be a server, processor, computer, or data processing device, or combination of the same, configured to perform the functions and/or processes described herein. The vault encryption abstraction server 404 may be used to receive check images and associated data and/or validation scores, retrieve user profile, evaluate the check image compared to the user profile, identify matching or non-matching elements, generate user interfaces, and the like.

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the vault encryption abstraction server 404, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A method comprising:
receiving, via an application interface by an abstraction framework and from an application, an electronic command request to update an electronic security token, wherein the request is in a first format;
triggering, by the abstraction framework and based on the electronic command, generation of the electronic security token by a vaulting application;
receiving, via a vault interface and from the vaulting application, a response message comprising the electronic security token, wherein the response message is in a second format; and
communicating, via the application interface and via a network by the abstraction framework, a second response message comprising the electronic security token, wherein the second response message is in the first format.

2. The method of claim 1, comprising:
configuring, via a configuration file, a scheduler of the abstraction framework via a configuration file; and
triggering, based on a scheduling event triggered by the scheduler, the application to request an update to the electronic security token.

3. The method of claim 1, wherein the first format comprises a configuration file and the second format comprises an application programming interface function.

4. The method of claim 1, wherein the first format comprises a first application programming interface function and the second format comprises a second application interface function, wherein the first application programming interface function is incompatible with the second application programming interface function.

5. The method of claim 1, comprising:
storing, by the abstraction framework, information about the request received from the application and the response from the vaulting application.

6. A system comprising:
a first computing device processing instructions to provide functionality via a first application;
a vault computing device processing instructions to provide data vault and encryption services; and
a framework computing device comprising:
a processor; and
non-transitory memory storing instructions that, when executed by a processor, cause the framework computing device to:
receive, via an application interface by an abstraction framework and from the first computing device, an electronic command request from the application to update an electronic security token, wherein the request is in a first format;
trigger, by the abstraction framework and based on the electronic command, generation of the electronic security token by the vault computing device;
receive, via a vault interface and from the vault computing device, a response message comprising the electronic security token, wherein the response message is in a second format; and
send, via the application interface and via a network by the abstraction framework to the first computing device, a second response message comprising the electronic security token, wherein the second response message is in the first format.

7. The system of claim 6, wherein the instructions further cause the framework computing device to:
configure, via a configuration file, a scheduler of the abstraction framework via a configuration file; and
initiate, based on a scheduling event at the first computing device triggered by the scheduler, the first application to communicate a request to update to the electronic security token.

8. The system of claim 7, wherein the instructions further cause the framework computing device to send, by the scheduler via the network, the scheduling event to the first computing device.

9. The system of claim 8, wherein the scheduling event is generated by the framework computing device and pushed to the first computing device.

10. The system of claim 6, wherein the first format comprises a configuration file and the second format comprises an application programming interface function.

11. The system of claim 6, wherein the first format comprises a first application programming interface function and the second format comprises a second application interface function, wherein the first application programming interface function is incompatible with the second application programming interface function.

12. The system of claim 6, wherein the instructions further cause the framework computing device to store, by the abstraction framework, information about the request received from the application and the response from the vault computing device.

13. Non-transitory computer readable media storing instructions, that when executed by a processor, cause a computing device to:
receive, via an application interface by an abstraction framework and from a first computing device, an electronic command request from an application to update an electronic security token, wherein the request is in a first format;
trigger, by the abstraction framework and based on the electronic command, generation of the electronic security token by a vault computing device;
receive, via a vault interface and from the vault computing device, a response message comprising the electronic security token, wherein the response message is in a second format; and
send, via the application interface and via a network by the abstraction framework to the first computing device, a second response message comprising the electronic security token, wherein the second response message is in the first format.

14. The computer readable media of claim 13, wherein the instructions further cause the computing device to:
configure, via a configuration file, a scheduler of the abstraction framework via a configuration file; and
initiate, based on a scheduling event at the first computing device triggered by the scheduler, the application to communicate a request to update to the electronic security token.

15. The computer readable media of claim 14, wherein the instructions further cause the computing device to send, by the scheduler via the network, the scheduling event to the first computing device.

16. The computer readable media of claim 14, wherein the scheduling event is generated by the framework computing device and pushed to the first computing device.

17. The computer readable media of claim 13, wherein the first format comprises a configuration file and the second format comprises an application programming interface function.

18. The computer readable media of claim 13, wherein the first format comprises a first application programming interface function and the second format comprises a second application interface function, wherein the first application programming interface function is incompatible with the second application programming interface function.

19. The computer readable media of claim 13, wherein the instructions further cause the framework computing device to store, by the abstraction framework, information about the request received from the application and the response from the vault computing device.

* * * * *